US011932039B2

(12) United States Patent
Murayama et al.

(10) Patent No.: US 11,932,039 B2
(45) Date of Patent: Mar. 19, 2024

(54) PRETREATMENT DEVICE, METHOD OF PRETREATMENT FOR PRETREATMENT DEVICE, AND PRINTING APPARATUS

(71) Applicant: SEIKO EPSON CORPORATION, Tokyo (JP)

(72) Inventors: Masato Murayama, Matsumoto (JP); Kazuto Aoki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 226 days.

(21) Appl. No.: 17/651,997

(22) Filed: Feb. 22, 2022

(65) Prior Publication Data

US 2022/0266616 A1 Aug. 25, 2022

(30) Foreign Application Priority Data

Feb. 24, 2021 (JP) ................................ 2021-027106

(51) Int. Cl.
*B41M 5/00* (2006.01)
*B41J 11/00* (2006.01)

(52) U.S. Cl.
CPC ........ *B41M 5/0017* (2013.01); *B41J 11/0015* (2013.01)

(58) Field of Classification Search
CPC ..... B41J 11/0015; B41M 5/0017; B41F 23/02
See application file for complete search history.

(56) References Cited

U.S. PATENT DOCUMENTS

2019/0009550 A1* 1/2019 Inoue .................. B41M 5/0017

FOREIGN PATENT DOCUMENTS

JP 2004-330568 A 11/2004
JP 2019-052406 A 4/2019

* cited by examiner

*Primary Examiner* — Julian D Huffman
(74) *Attorney, Agent, or Firm* — WORKMAN NYDEGGER

(57) ABSTRACT

A pretreatment device includes: a medium support portion configured to support a medium that is transported; a pretreatment-agent ejecting portion configured to eject a pretreatment agent; an absorbing-member support portion configured to support an absorbing member between the medium and the pretreatment-agent ejecting portion in a direction in which the pretreatment agent is ejected, the absorbing member being configured to absorb the pretreatment agent ejected from the pretreatment-agent ejecting portion; and a pressing unit configured to press, toward the medium, the absorbing member to which the pretreatment agent is ejected from the pretreatment-agent ejecting portion.

10 Claims, 5 Drawing Sheets

PRETREATMENT DEVICE, METHOD OF PRETREATMENT FOR PRETREATMENT DEVICE, AND PRINTING APPARATUS

The present application is based on, and claims priority from JP Application Serial Number 2021-027106, filed on Feb. 24, 2021, the disclosure of which is hereby incorporated by reference herein in its entirety.

BACKGROUND

1. Technical Field

The present disclosure relates to a pretreatment device, a method of pretreatment for a pretreatment device, and a printing apparatus.

2. Related Art

In related arts, an ink eject-type printing device has existed. For example, a printing device described in JP-A-2004-330568 includes a pretreatment step portion, printing processing step portion, and a post-treatment step portion. The pretreatment step portion is configured to cause a pretreatment liquid to eject onto a front surface of a printing recording medium to perform application. The printing processing step portion is configured to cause an ink to eject onto the front surface of the printing recording medium to which the pretreatment liquid has been applied, to perform printing. The post-treatment step portion is configured to apply a post-treatment liquid to the front surface of the printing recording medium to which printing has been performed. The printing recording medium includes, for example, paper or cloth.

In a case of employing a configuration in which a pretreatment liquid is ejected onto a printing recording medium to apply it as in JP-A-2004-330568, there exist the following concerns. That is, when the pretreatment liquid is ejected onto the printing recording medium, a mist of the pretreatment liquid takes place, and there is a possibility that this mist spreads to the surroundings. In addition, there is a concern that the spreading mist adheres to other surrounding units.

Thus, in order to suppress occurrence of or spreading of the mist of the pretreatment liquid, it is considered, for example, to further reduce the amount of ejecting of the pretreatment liquid. In such a case, however, there is a possibility that a so-called application irregularity of the pretreatment agent occurs. The application irregularity represents unevenness of the thickness of the applied pretreatment liquid.

SUMMARY

A pretreatment device provided to solve the problems described above includes a medium support portion configured to support a medium that is transported, a pretreatment-agent ejecting portion configured to eject a pretreatment agent, an absorbing-member support portion configured to support an absorbing member between the medium and the pretreatment-agent ejecting portion in a direction of the pretreatment agent ejected, the absorbing member being configured to absorb the pretreatment agent ejected from the pretreatment-agent ejecting portion, and a pressing unit configured to press, toward the medium, the absorbing member to which the pretreatment agent is ejected from the pretreatment-agent ejecting portion.

A method of pretreatment for a pretreatment device is provided to solve the problems described above, the pretreatment device including a medium support portion configured to support a medium that is transported, a pretreatment-agent ejecting portion configured to eject a pretreatment agent, an absorbing-member support portion configured to support an absorbing member between the medium and the pretreatment-agent ejecting portion in a direction of the pretreatment agent ejected, the absorbing member being configured to absorb the pretreatment agent ejected from the pretreatment-agent ejecting portion, and a pressing unit configured to press, toward the medium, the absorbing member to which the pretreatment agent is ejected from the pretreatment-agent ejecting portion. This method of pretreatment for a pretreatment device includes ejecting the pretreatment agent from the pretreatment-agent ejecting portion onto the absorbing member, and also includes pressing, by the pressing unit, toward the medium the absorbing member to which the pretreatment agent is ejected to transfer, to the medium, the pretreatment agent absorbed by the absorbing member.

A printing apparatus provided to solve the problems described above includes a pretreatment device and a liquid ejecting device. The pretreatment device includes a medium support portion configured to support a medium that is transported, a pretreatment-agent ejecting portion configured to eject a pretreatment agent, an absorbing-member support portion configured to support an absorbing member between the medium and the pretreatment-agent ejecting portion in a direction of the pretreatment agent ejected, the absorbing member being configured to absorb the pretreatment agent ejected from the pretreatment-agent ejecting portion, and a pressing unit configured to press, toward the medium, the absorbing member to which the pretreatment agent is ejected from the pretreatment-agent ejecting portion. The liquid ejecting device is provided alongside the pretreatment device in a transport direction of the medium and includes a liquid ejecting head configured to eject a liquid onto the medium to which pretreatment is applied by the pretreatment device, to form an image.

DESCRIPTION OF EXEMPLARY EMBODIMENTS

First Embodiment

Below, a first embodiment in which a pretreatment device is embodied in a printing apparatus will be described. The printing apparatus is an ink eject-type printer in which a printing liquid, which is a liquid used to perform printing, is ejected onto a medium serving as the target of printing to perform printing. The medium is, for example, a fiber, and includes clothing and fabric. The printing liquid is, for example, an ink for textile printing.

Printing Apparatus

Figure 1:
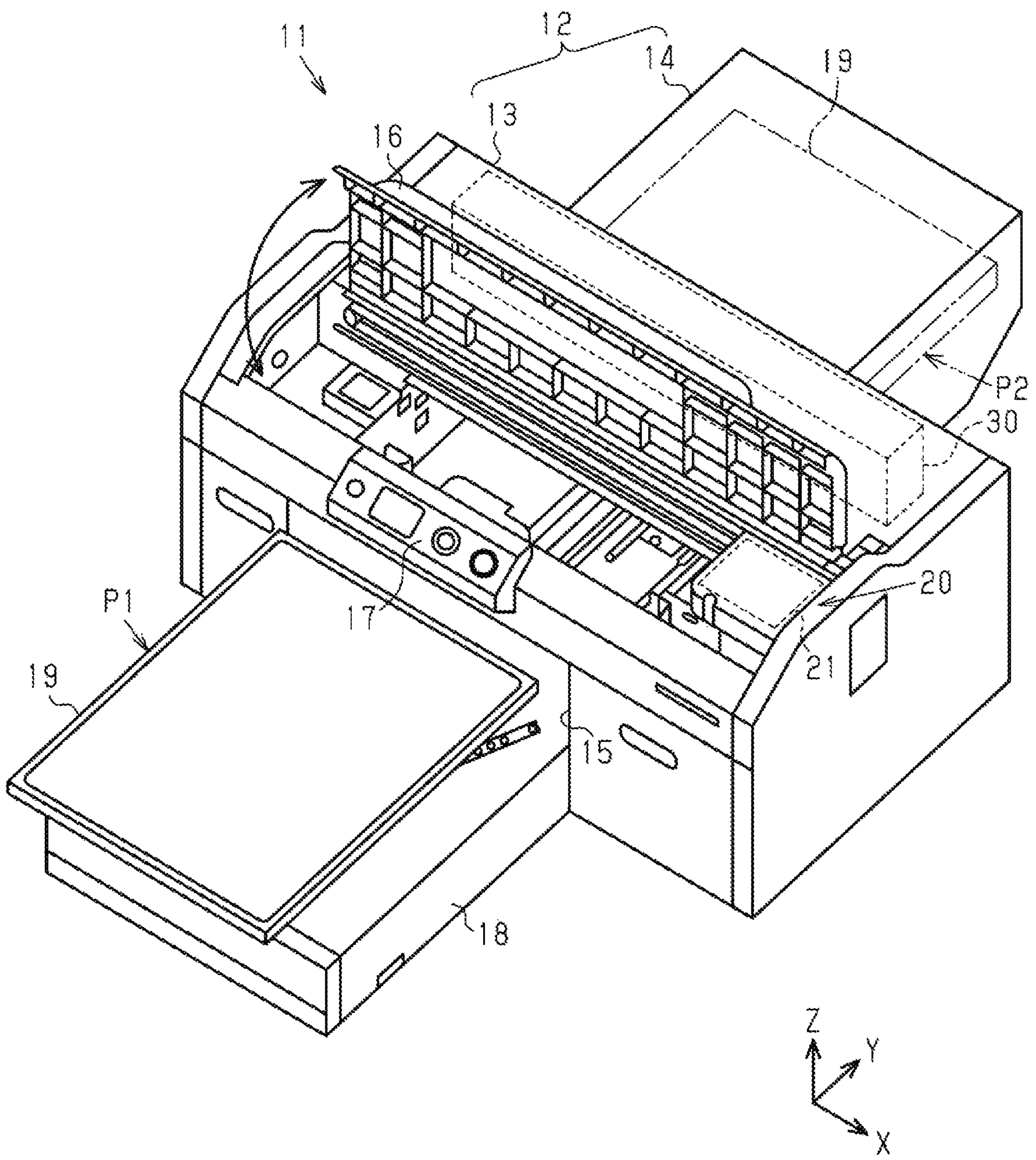
FIG. 1 is a perspective view illustrating a printing apparatus on which a pretreatment device according to a first embodiment is mounted.

As illustrated in FIG. 1, the printing apparatus 11 includes a housing 12. The housing 12 includes a first housing 13 and a second housing 14. The first housing 13 and the second housing 14 each have a cuboid shape. Long sides of the first housing 13 extend along the X-axis in a Cartesian coordinate system comprised of X, Y, and Z axes. It should be noted that a direction along the X-axis is a left direction or right direction; a direction along the Y-axis is a frontward direction or rearward direction; and a direction along the Z-axis is an upward direction or downward direction. The second housing 14 is provided at a rear surface of the first housing 13. The interior of the first housing 13 and the interior of the second housing 14 communicate with each other.

The first housing 13 includes an opening portion 15, a cover 16, and an operating panel 17. The opening portion 15 is provided at the front face of the first housing 13. The opening portion 15 communicates the interior and the exterior of the first housing 13. The cover 16 is provided at the upper surface of the first housing 13. The cover 16 can open and close by being caused to rotate with the shaft provided at the base end of the cover being the center. The cover 16 is opened, for example, at the time of cleaning the inside of the first housing 13. The operating panel 17 is provided at the upper portion of the front face of the first housing 13. The operating panel 17 includes a display including various types of switches used to operate the printing apparatus 11, and also displaying an operation state of the printing apparatus 11.

The printing apparatus 11 includes a transport device 18. The transport device 18 is provided within the housing 12. However, a portion of the transport device 18 sticks out from the opening portion 15 of the first housing 13 in the frontward direction. The transport device 18 includes a tray 19. The tray 19 is supported through a supporting member, which is not illustrated, of the transport device 18. The supporting member can move along the Y-axis. In association with movement of the supporting member, the tray 19 moves between a first position P1 illustrated with the solid line in FIG. 1 and a second position P2 illustrated with the long dashed double-short dashed line in FIG. 1. The first position P1 is a position where the tray 19 is exposed to the outside of the first housing 13, and also is a position where a medium serving as the target of printing is set at the upper surface of the tray 19. The second position P2 is a position where the rear end of the tray 19 enters the inside of the second housing 14, and is, for example, a position where printing to the medium starts.

The printing apparatus 11 includes a liquid ejecting device 20 and a pretreatment device 30. The liquid ejecting device 20 and the pretreatment device 30 are provided within the housing 12. The liquid ejecting device 20 and the pretreatment device 30 are provided alongside each other in a direction along the Y-axis serving as a transport direction of the medium. The pretreatment device 30 is disposed at the rear of the liquid ejecting device 20 along the Y-axis. The pretreatment device 30 applies pretreatment to the medium. The liquid ejecting device 20 includes a liquid ejecting head 21. The liquid ejecting head 21 can reciprocate in a direction along the X-axis while being guided by the guide member, which is not illustrated. The liquid ejecting head 21 ejects a printing liquid onto the medium to which pretreatment has been applied, to form an image. This image includes a character, a drawing, and the like.

The pretreatment device 30 applies a pretreatment agent that is a liquid and serves as pretreatment to the medium, to a printing range of the medium or to a range slightly wider than the printing range. The purpose of application of the pretreatment to the medium includes the following (A1) to (A3).

(A1) A chromogenic property is prevented from deteriorating due to the printing liquid penetrating the medium. In particular, a remarkable effect can be achieved when a medium is black and a printing liquid used to perform printing to the medium is white.

(A2) By fixing the printing liquid on the medium, abrasion resistance of a printed image is improved.

(A3) A pretreatment agent is applied to a medium to fix lint at the front surface of the medium, thereby preventing lint from rising. This makes it possible to prevent lint from adhering to the liquid ejecting head 21. It is possible to prevent a printing liquid from falling down due to adhesion of lint, or prevent the medium and lint adhering to the liquid ejecting head 21 from being rubbed with each other.

Pretreatment Device

Next, the pretreatment device 30 will be described in detail.

Figure 2:
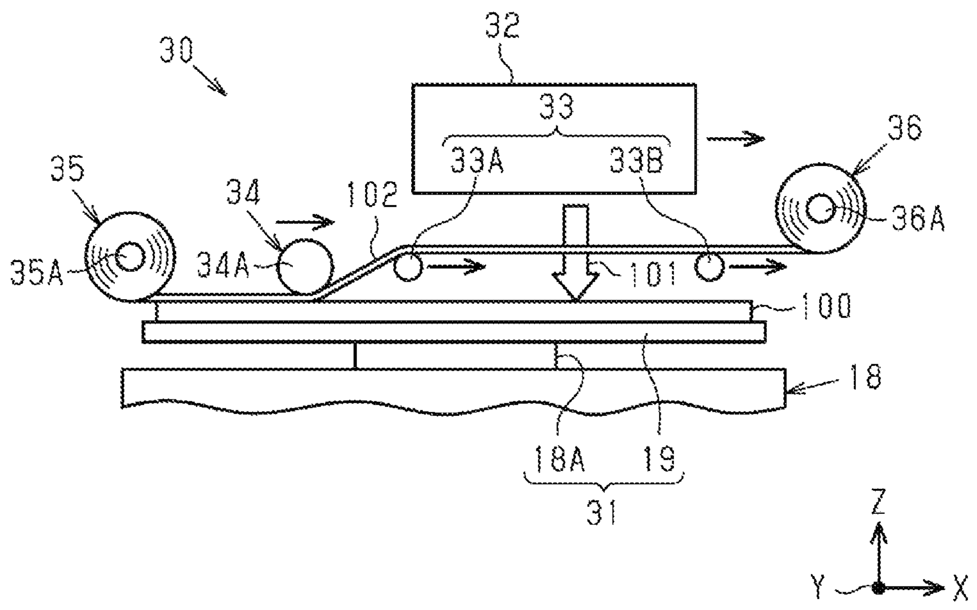
FIG. 2 is a diagram illustrating a configuration of the pretreatment device according to the first embodiment.

As illustrated in FIG. 2, the pretreatment device 30 includes a medium support portion 31, a pretreatment-agent ejecting portion 32, an absorbing-member support portion 33, and the pressing unit 34.

The medium support portion 31 is configured to support a medium 100. A supporting member 18A of the transport device 18 and the tray 19 are commonly used in the medium support portion 31. The medium support portion 31 can move in a direction along the Y-axis in a state of supporting the medium 100.

The pretreatment-agent ejecting portion 32 is disposed above the transport device 18. The medium 100 is transported by the transport device 18 at a position below the pretreatment-agent ejecting portion 32. The medium 100 is in a state of being supported by the medium support portion 31. The pretreatment-agent ejecting portion 32 causes a pretreatment agent 101 to eject. The pretreatment-agent ejecting portion 32 includes a spray or a head. Nozzles of the spray or head face downward along the Z-axis. That is, the direction in which the pretreatment agent 101 is ejected is downward. The pretreatment-agent ejecting portion 32 causes the pretreatment agent 101 to eject toward the medium 100 disposed below the pretreatment-agent ejecting portion 32. The pretreatment-agent ejecting portion 32 is provided so as to be able to move in a direction along the X-axis through drive of a movement mechanism that is not illustrated. The size of the pretreatment-agent ejecting portion 32 is set on an as-necessary basis in line with product specifications or the like.

The absorbing-member support portion 33 is configured to support an absorbing member 102 disposed between the pretreatment-agent ejecting portion 32 and the medium 100 supported by the medium support portion 31. The absorbing-member support portion 33 is provided between the absorbing member 102 and the medium 100 in a direction along the Z-axis that is a direction of the pretreatment agent 101 ejected. The absorbing-member support portion 33 is configured to support the absorbing member 102 at a position where the absorbing member 102 is opposed to the pretreatment-agent ejecting portion 32 in the direction of the pretreatment agent 101 ejected.

Figure 3:
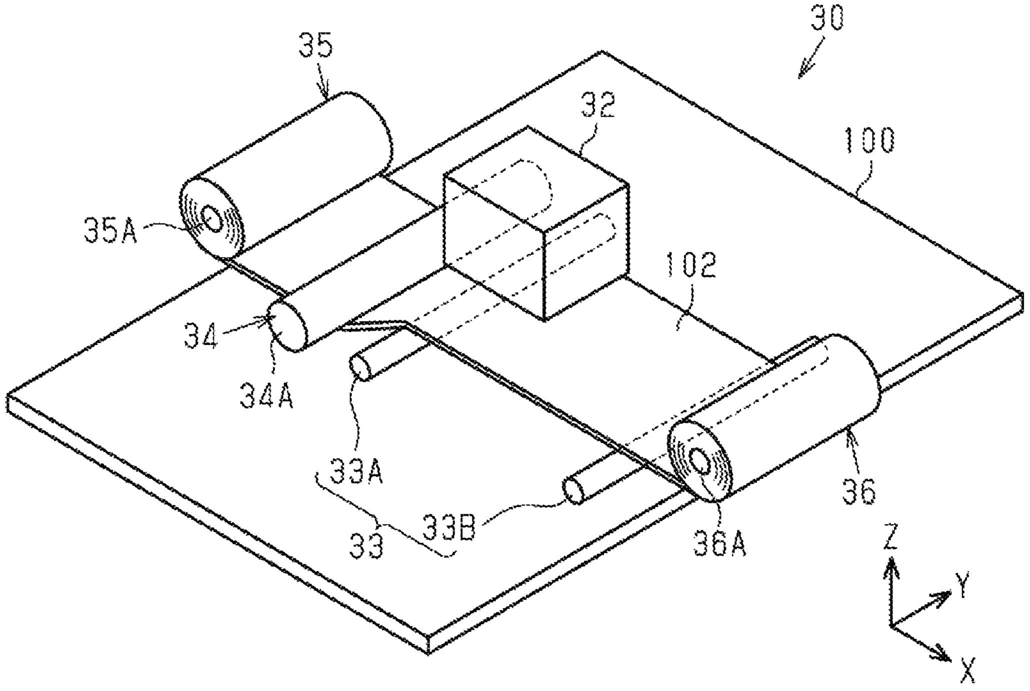
FIG. 3 is a perspective view illustrating the pretreatment device in FIG. 2.

As illustrated in FIG. 3, the absorbing member 102 have a predetermined width in a direction along the Y-axis, and continuously extends in a direction along the X-axis. The width of the absorbing member 102 is set, for example to be a length shorter than the length of the medium 100 in a direction of along the Y-axis. The absorbing member 102 can absorb the pretreatment agent 101 ejected from the pretreatment-agent ejecting portion 32. The absorbing member 102 may have a higher ability to absorb the pretreatment agent 101 than the medium 100 has. For the absorbing member 102, for example, cloth, urethane foam, nonwoven cloth, or the like is used. The size of the absorbing member 102 is set on an as-necessary basis in line with product specifications or the like.

The absorbing-member support portion 33 includes, for example, two guide rollers 33A and 33B. Both of the guide rollers 33A and 33B are identical to each other. Both of the guide rollers 33A and 33B extend in a direction along the Y-axis. Both of the guide rollers 33A and 33B are parallel to each other. Both of the guide rollers 33A and 33B are rotatably supported, for example, through a supporting member (not illustrated) coupled to the pretreatment-agent ejecting portion 32. That is, both of the guide rollers 33A and 33B are provided so as to be able to move in a direction along the X-axis in association with movement of the pretreatment-agent ejecting portion 32.

As illustrated in FIG. 2, both of the guide rollers 33A and 33B are disposed between the pretreatment-agent ejecting portion 32 and the medium 100 supported by the medium support portion 31. Both of the guide rollers 33A and 33B are each provided so as to be separated relative to the medium 100 supported by the medium support portion 31 by the same predetermined distance in a direction along the Z-axis. In addition, both of the guide rollers 33A and 33B are each separated relative to the pretreatment-agent ejecting portion 32 by the same predetermined distance in a direction along the Z-axis.

Both of the guide rollers 33A and 33B are separated from each other in a direction along the X-axis. The separation distance between both of the guide rollers 33A and 33B is set, for example, to be a length substantially the same as the length of the pretreatment-agent ejecting portion 32 in a direction along the X-axis. That is, the two guide rollers 33A and 33B are provided with the pretreatment-agent ejecting portion 32 being disposed therebetween, as viewed from a direction along the Z-axis. The pretreatment-agent ejecting portion 32 is disposed between the two guide rollers 33A and 33B as viewed from a direction along the Z-axis.

The two guide rollers 33A and 33B are configured to support the absorbing member 102 from below and along the Z-axis. A portion of the absorbing member 102 that is supported by both of the guide rollers 33A and 33B is kept in a state of being parallel to the upper surface of the medium 100 supported by the medium support portion 31. The absorbing member 102 is kept in a state of being separated from the pretreatment-agent ejecting portion 32 by a predetermined distance in a direction along the Z-axis. It is preferable that the distance between the absorbing member 102 and the pretreatment-agent ejecting portion 32 is set to be a shorter distance within an allowable range. In addition, the absorbing member 102 is kept in a state of being separated from the medium 100 supported by the medium support portion 31 by a predetermined distance in a direction along the Z-axis.

The pressing unit 34 is configured to press, toward the medium 100, the absorbing member 102 to which the pretreatment agent is ejected from the pretreatment-agent ejecting portion 32. The medium 100 is in a state of being supported by the medium support portion 31.

As illustrated in FIG. 3, the pressing unit 34 is provided so as not to overlap with the pretreatment-agent ejecting portion 32 or the absorbing-member support portion 33, as viewed from a direction of the pretreatment agent 101 ejected. More specifically, the pressing unit 34 is disposed at a side of the pretreatment-agent ejecting portion 32 and the absorbing-member support portion 33 in a direction along the X-axis that is a direction in which the pressing unit 34 moves relatively to the medium 100, as viewed from the direction of the pretreatment agent 101 ejected. The pressing unit 34 includes, for example, a press roller 34A. The press roller 34A extends in a direction along the Y-axis. The press roller 34A is parallel to the two guide rollers 33A and 33B described above. The press roller 34A is rotatably supported, for example, through a supporting member (not illustrated) coupled to the pretreatment-agent ejecting portion 32. That is, the press roller 34A is provided so as to be able to move in a direction along the X-axis in association with movement of the pretreatment-agent ejecting portion 32. Thus, the pretreatment-agent ejecting portion 32, both of the guide rollers 33A and 33B, and the press roller 34A integrally move in a direction along the X-axis through movement of the movement mechanism described above. It should be noted that the supporting member that supports the press roller 34A may be the same supporting member described above and configured to support both of the guide rollers 33A and 33B, or may be another independent member.

As illustrated in FIG. 2, the press roller 34A is disposed at an opposite side from the guide roller 33B in a direction along the X-axis with the guide roller 33A being a reference. That is, the guide roller 33A is disposed between the press roller 34A and the guide roller 33B in a direction along the X-axis. The length of the outer diameter of the press roller 34A is set to be a length longer than the outer diameter of the two guide rollers 33A and 33B. However, the central axis of rotation of the press roller 34A and the central axes of rotation of the two guide rollers 33A and 33B are disposed on the same flat surface parallel to the X-Y plane. The press roller 34A is provided so as to be separated, in a direction along the Z-axis, from the upper surface of the medium 100 supported by the medium support portion 31 by approximately the thickness of the absorbing member 102 or by the distance slightly shorter than the thickness of the absorbing member 102. In addition, the press roller 34A is provided so as to be parallel to the upper surface of the medium 100 supported by the medium support portion 31. Thus, the press roller 34A can sandwich the absorbing member 102 with the medium 100 supported by the medium support portion 31. The press roller 34A is kept in a state of being in contact with the upper surface of the absorbing member 102.

The pretreatment device 30 includes a feeding portion 35 and a winding unit 36. The feeding portion 35 is a portion configured to feed the absorbing member 102 to the medium support portion 31. The winding unit 36 is a portion configured to wind the absorbing member 102 supported by the medium support portion 31. The feeding portion 35 and the winding unit 36 are separated from each other in a direction along the X-axis. The separation distance between the feeding portion 35 and the winding unit 36 is set to be at least a length longer than the length of the tray 19 in a direction along the X-axis. The feeding portion 35 is disposed at an opposite side from the guide roller 33A in a direction along the X-axis with the press roller 34A being a reference. The winding unit 36 is disposed at an opposite side from the guide roller 33A in a direction along the X-axis with the guide roller 33B being a reference. The feeding portion 35 and the winding unit 36 are provided so as not to interfere with constituent elements of the pretreatment device 30 including the pretreatment-agent ejecting portion 32, the two guide rollers 33A and 33B, and the press roller 34A that move in a direction along the X-axis.

As illustrated in FIG. 3, the feeding portion 35 includes a feeding shaft 35A. The feeding shaft 35A extends in a direction along the Y-axis. The feeding shaft 35A is parallel to the press roller 34A and the two guide rollers 33A and 33B. Both ends of the feeding shaft 35A are rotatably supported through a support portion (not illustrated) provided, for example, within the first housing 13. The absorbing member 102 is held by the feeding shaft 35A in a wound state. The feeding shaft 35A rotates through drive of a driving mechanism that is not illustrated, to feed the absorbing member 102 along the X-axis toward the medium support portion 31.

The winding unit 36 includes a winding shaft 36A. The winding shaft 36A extends in a direction along the Y-axis. The winding shaft 36A is parallel to the feeding shaft 35A. Both ends of the winding shaft 36A are rotatably supported through a support portion (not illustrated) provided, for example, within the first housing 13. The winding shaft 36A rotates through drive of a driving mechanism that is not illustrated, to wind the absorbing member 102 supported by the medium support portion 31.

It should be noted that a portion of the absorbing member 102 that is disposed between the feeding portion 35 and the winding unit 36 is kept in a state of being supported by the two guide rollers 33A and 33B. In addition, the press roller 34A is kept in a state of being in contact with the upper surface of the absorbing member 102. A portion of the absorbing member 102 that is disposed between the two guide rollers 33A and 33B is parallel to the moving direction of the pretreatment-agent ejecting portion 32 along the X-axis. A portion of the absorbing member 102 that is disposed between the press roller 34A and the guide roller 33A is sloped in accordance with a difference between the diameter of the press roller 34A and the outer diameter of the guide roller 33A, or a positional relationship in a direction along the Z-axis between the press roller 34A and the guide roller 33A. A portion of the absorbing member 102 that is in contact with the guide roller 33A is disposed at a position closer to the pretreatment-agent ejecting portion 32 in a direction along the Z-axis than a portion of the absorbing member 102 that is in contact with the press roller 34A.

Pretreatment Operation of Pretreatment Device

Next, operation of the pretreatment device 30 will be described.

At the time of applying pretreatment to the medium 100, the absorbing member 102 that has been fed from the feeding portion 35 is kept in a state of being supported by the absorbing-member support portion 33. In addition, at the time of applying pretreatment to the medium 100, the medium 100 supported by the medium support portion 31 is moved by the transport device 18 to a starting position for pretreatment. The starting position for pretreatment is a position from which the pretreatment-agent ejecting portion 32 can pass, in a direction along the X-axis, above a region of the medium 100 for application of the pretreatment agent 101. The region for application of the pretreatment agent 101 is set, for example, on the basis of a printing region of an image designated through an external device. The region for application of the pretreatment agent 101 may be set, for example, along the outline of an image to be printed on the medium 100. Here, by way of example, the application region of the medium 100 is a portion of the upper surface of the medium 100 supported by the medium support portion 31, and the entire application region overlaps with the absorbing member 102 as viewed from a direction along the Z-axis. In addition, the width of the region for application of the pretreatment agent 101, which is the length thereof in a direction along the Y-axis, is set approximately to be a length that fits in a eject region where the predetermined agent 101 is ejected from the pretreatment-agent ejecting portion 32.

After the medium 100 is moved to the starting position for pretreatment, the transport device 18 is kept in a state of being stopped. In this state, the pretreatment-agent ejecting portion 32 starts operation for applying the pretreatment agent 101 to the entire area of the application region of the medium 100. The pretreatment-agent ejecting portion 32 causes the pretreatment agent 101 to eject toward the region of the medium 100 for application of the pretreatment agent 101, while moving toward a predetermined direction along the X-axis with the original position being a reference. The velocity of movement of the pretreatment-agent ejecting portion 32 is kept at a constant predetermined velocity. The original position of the pretreatment-agent ejecting portion 32 is set, for example, at a leftmost position of a range where the pretreatment-agent ejecting portion 32 can move in a direction along the X-axis. At the start of execution of the pretreatment to the medium 100, the pretreatment-agent ejecting portion 32 causes the pretreatment agent 101 to eject while moving to the right direction along the X-axis with the original position being a reference.

The pretreatment agent 101 is first sprayed onto the absorbing member 102 disposed between the pretreatment-agent ejecting portion 32 and the medium 100. A portion of this sprayed pretreatment agent 101 is absorbed by the absorbing member 102 while the rest of the pretreatment agent 101 that is not absorbed passes through the absorbing member 102 and adheres to the medium 100. When the pretreatment agent 101 is sprayed onto the absorbing member 102, a mist of the pretreatment agent 101 may happen. This mist, however, is also absorbed by the absorbing member 102. This makes it possible to suppress spreading of the mist of the pretreatment agent 101 to the surroundings. In addition, the pretreatment agent 101 absorbed by the absorbing member 102 diffuses within the absorbing member 102. Thus, it is possible to uniformly store the pretreatment agent 101 within the absorbing member 102.

The two guide rollers 33A and 33B of the absorbing-member support portion 33 move in association with movement of the pretreatment-agent ejecting portion 32. The two guide rollers 33A and 33B move toward the right direction along the X-axis while supporting the lower surface of the absorbing member 102. The two guide rollers 33A and 33B are held at a position that is off the nozzle of the pretreatment-agent ejecting portion 32 in a direction along the X-axis. Thus, the two guide rollers 33A and 33B do not block the pretreatment agent 101 ejected. In addition, the distance, in a direction along the Z-axis, between the pretreatment-agent ejecting portion 32 and a portion of the absorbing member 102 that is supported by the two guide rollers 33A and 33B is kept at a constant distance. Thus, the pretreatment agent 101 is uniformly sprayed onto the absorbing member 102. Furthermore, the distance, in a direction along the Z-axis, between the pretreatment-agent ejecting portion 32 and a portion of the absorbing member 102 that is supported by the two guide rollers 33A and 33B is set to be a shorter distance that falls in an allowable range. Thus, when the pretreatment agent 101 is sprayed onto the absorbing member 102, it is possible to suppress occurrence of a mist of the pretreatment agent 101.

The press roller 34A of the pressing unit 34 follows the pretreatment-agent ejecting portion 32 and the two guide rollers 33A and 33B. The press roller 34A moves in a right direction along the X-axis while pressing, against the upper surface of the medium 100, the absorbing member 102 onto which the pretreatment agent 101 has been sprayed. As the absorbing member 102 is pressed against the medium 100, the pretreatment agent 101 infiltrated into the absorbing member 102 is transferred to the medium 100. That is, as the absorbing member 102 is pressed against the medium 100, the pretreatment agent 101 stored in the absorbing member 102 is squeezed out, and at the same time, the pretreatment agent 101 that has been squeezed out is applied to the medium 100. The pretreatment agent 101 is uniformly stored in the absorbing member 102. Thus, it is possible to suppress irregularity of application of the pretreatment agent 101 to the medium 100. In addition, as the absorbing member 102 is pressed against the front surface of the medium 100, the front surface of the medium 100 is in a state where lint is laid down. Thus, it is possible to prevent lint from rising at the front surface of the medium 100. Eventually, the absorbing member 102 is pressed against the entire area of the region of the medium 100 for application of the pretreatment agent 101, thereby applying the pretreatment agent 101 to the entire area of the region for application of the pretreatment agent 101.

Thus, the pretreatment to the medium 100 is completed.

It should be noted that a used absorbing member 102 may be collected every time the pretreatment to the medium 100 is completed. However, when the region of the medium 100 for application of the pretreatment agent 101 at this time is the same as the region at the previous time, it may be possible to reuse the used absorbing member 102. This is because, if the absorbing member 102 that has been used in the previous time is reused when the region of the medium 100 for application of the pretreatment agent 101 at this time differs from the region at the previous time, there is a possibility that the pretreatment agent 101 is not appropriately applied to the application region this time. For example, as the absorbing member 102 used in the previous time is pressed against the medium 100, there is a possibility that the pretreatment agent 101 adheres to a portion different from the application region this time.

When a used absorbing member 102 is collected, the feeding shaft 35A of the feeding portion 35 is caused to rotate in a feeding direction to feed a new absorbing member 102. At the same time, the winding shaft 36A of the winding unit 36 is caused to rotate in a winding direction to wind the used absorbing member 102. Furthermore, the pretreatment-agent ejecting portion 32 is moved in a left direction along the X-axis to make the pretreatment-agent ejecting portion 32 return to the original position. In association with movement of the pretreatment-agent ejecting portion 32, the press roller 34A and the two guide rollers 33A and 33B also return to the corresponding original position. When the medium 100 to which pretreatment has been completed is discharged and then a new medium 100 is transported to the starting position for pretreatment, pretreatment to a new medium 100 is performed by using a new absorbing member 102.

When a used absorbing member 102 is reused, the pretreatment-agent ejecting portion 32 is caused to move in a left direction along the X-axis to make the pretreatment-agent ejecting portion 32 return to the original position. In association with movement of the pretreatment-agent ejecting portion 32, the press roller 34A and the two guide rollers 33A and 33B also return to the corresponding original position. When the medium 100 to which pretreatment has been completed is discharged and then a new medium 100 is transported to the starting position for pretreatment, pretreatment to the new medium 100 is performed by using the absorbing member 102 that has been used in the previous time.

Note that it can be considered that the size, in a direction along the Y-axis, of a region of the medium 100 for application of the pretreatment agent 101 exceeds a eject region where the predetermined agent 101 is ejected from the pretreatment-agent ejecting portion 32. In this case, only by performing, one time, an operation of pretreatment by the pretreatment device 30 described above, it is difficult to apply the pretreatment agent 101 to the entire area of the region of the medium 100 for application of the pretreatment agent 101. Thus, by repeating the following operations of (B1) to (B3), it is possible to apply the pretreatment agent 101 to the entire area of the region of the medium 100 for application of the pretreatment agent 101.

(B1) First operation: the pretreatment-agent ejecting portion 32 is caused to return to the original position. In association with movement of the pretreatment-agent ejecting portion 32, the press roller 34A and the two guide rollers 33A and 33B also return to the corresponding original position. In a manner similar to that described above, it may be possible to collect or reuse the used absorbing member 102 in accordance with the region for application of the pretreatment agent 101, the region being set in the medium 100.

(B2) Second operation: the transport device 18 is used to cause the medium 100 to move in the frontward direction or the rearward direction along the Y-axis by a predetermined distance. The predetermined distance is determined, for example, in accordance with a eject region where the predetermined agent 101 is ejected by the pretreatment-agent ejecting portion 32.

(B3) Third operation: the pretreatment-agent ejecting portion 32 is used to apply the pretreatment agent 101 to the medium 100. Here, in the region of the medium 100 for application of the pretreatment agent 101, the pretreatment agent 101 is applied to a portion positionally shifted toward the frontward direction or the rearward direction along the Y-axis by a predetermined distance with a reference being set to a portion where the pretreatment agent 101 is applied in the previous time.

In this manner, movement of the pretreatment-agent ejecting portion 32 in a direction along the X-axis and movement of the medium 100 in a direction along the Y-axis are combined to perform an operation of pretreatment by the pretreatment device 30 plural times. This makes it possible to apply the pretreatment agent 101 to the entire area of the region of the medium 100 for application of the pretreatment agent 101.

After the pretreatment to the medium 100 is completed, it may be possible to continuously perform printing to the medium 100. A printing liquid is caused to be ejected from the liquid ejecting head 21 of the liquid ejecting device 20 onto a portion of the medium 100 where the pretreatment has been applied, to form a predetermined image in a printing region of the medium 100.

Effect of First Embodiment

Thus, with the first embodiment, it is possible to obtain the following effects.

(1) The absorbing member 102 is provided between the pretreatment-agent ejecting portion 32 and the medium 100 supported by the medium support portion 31. The pretreatment agent 101 ejected from the pretreatment-agent ejecting portion 32 is first sprayed onto the absorbing member 102. The mist of the pretreatment agent 101 occurring when the pretreatment agent 101 is sprayed onto the absorbing member 102 is absorbed by the absorbing member 102. Thus, it is possible to suppress spreading of the mist of the pretreatment agent 101. Thus, the pretreatment-agent ejecting portion 32 can cause a large amount of the pretreatment agent 101 to eject in a shorter time.

(2) The pretreatment-agent ejecting portion 32 causes the pretreatment agent 101 to eject while moving at a constant predetermined velocity. For example, this makes it possible to make more uniform the amount of the pretreatment agent 101 ejected per unit surface area relative to the medium 100. Thus, it is possible to more uniformly store the pretreatment agent 101 within the absorbing member 102.

(3) A portion of the pretreatment agent 101 that is sprayed onto the absorbing member 102 is infiltrated into the absorbing member 102, and diffuses within the absorbing member 102. The absorbing member 102 into which the pretreatment agent 101 has been infiltrated is pressed against the medium 100 by the press roller 34A with uniform force. This makes it possible to squeeze the pretreatment agent 101 infiltrated into the absorbing member 102, and also makes it possible to apply the squeezed pretreatment agent 101 to the medium 100. Thus, it is possible to suppress occurrence of so-called application irregularity of the pretreatment agent 101. Furthermore, it is possible to further improve quality of an image printed on the medium 100. For example, it is possible to suppress irregular color of an image printed on the medium 100. In addition, it is possible to suppress occurrence of a stain or the like of the pretreatment agent 101 on the medium 100.

(4) As the absorbing member 102 is pressed by the press roller 34A against the front surface of the medium 100, it is possible to prevent lint from rising at the front surface of the medium 100.

(5) The pretreatment device 30 and the liquid ejecting device 20 are provided alongside each other in a direction along the Y-axis that is the transport direction of the medium 100. This makes it possible to continuously perform pretreatment and print an image to the medium 100.

(6) The pretreatment-agent ejecting portion 32, the absorbing-member support portion 33, and the pressing unit 34 are provided so as to be able to move relatively to the medium 100 in a direction intersecting the direction of the pretreatment agent 101 ejected. It is possible to apply the pretreatment agent 101 to the medium 100 in keeping with the configuration of the pretreatment device 30 described above. That is, by moving the pretreatment-agent ejecting portion 32, the pressing unit 34, and the absorbing-member support portion 33 relatively to the medium 100 in a direction along the X-axis intersecting the direction of the pretreatment agent 101 ejected, it is possible to apply the pretreatment agent 101 to the medium 100. In addition, the pressing unit 34 is disposed at a side of the pretreatment-agent ejecting portion 32 and the absorbing-member support portion 33 in a direction along the X-axis that is a direction in which the pressing unit 34 moves relatively to the medium 100, as viewed from the direction of the pretreatment agent 101 ejected. Thus, it is possible to apply the pretreatment agent 101 to the absorbing member 102, and subsequently transfer the pretreatment agent 101 to the medium 100.

Second Embodiment

Next, a second embodiment in which a pretreatment device is embodied in a printing apparatus will be described. The present embodiment basically has a configuration similar to that of the first embodiment described above. However, the present embodiment differs from the first embodiment in terms of the directions of attachment of the pretreatment-agent ejecting portion, the absorbing-member support portion, and the pressing unit to the housing of the printing apparatus, the size of each of the constituent elements of the pretreatment device, and the like. Thus, the same reference characters are attached to members and configurations similar to those in the first embodiment, and detailed explanation thereof will not be made.

Figure 4:
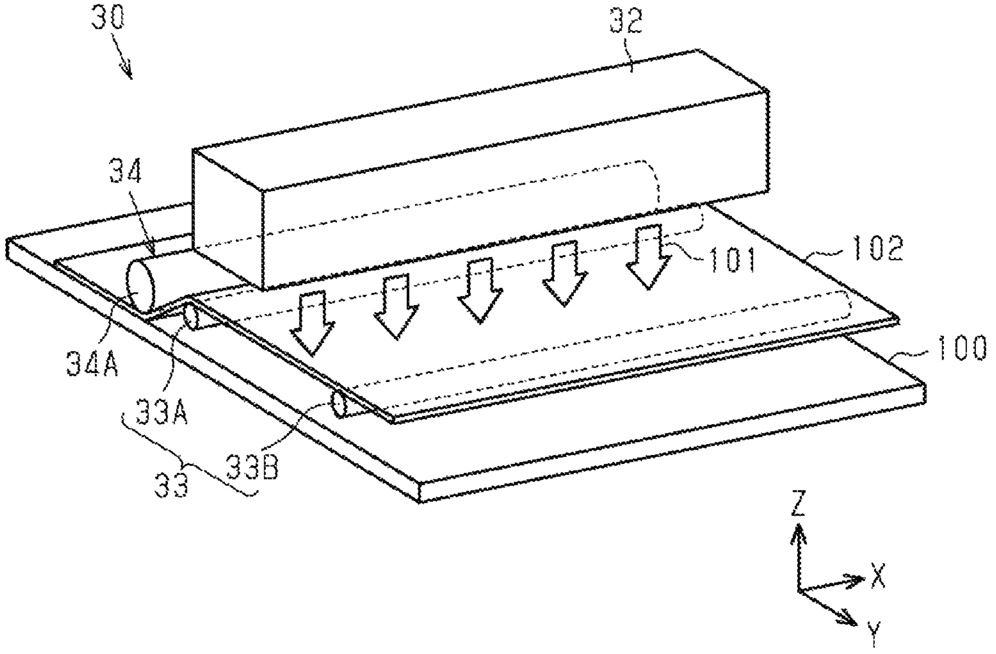
FIG. 4 is a perspective view illustrating a pretreatment device according to a second embodiment.

As illustrated in FIG. 4, the pretreatment device 30 includes the medium support portion 31, which is not illustrated, the pretreatment-agent ejecting portion 32, the absorbing-member support portion 33, and the pressing unit 34.

As in the first embodiment described above in FIG. 2, the supporting member 18A of the transport device 18 and the tray 19 are commonly used in the medium support portion 31.

The pretreatment-agent ejecting portion 32 is fixed within the first housing 13. The pretreatment-agent ejecting portion 32 has, for example, a line-shaped head extending in a direction along the X-axis. The width of the pretreatment-agent ejecting portion 32 is set, for example, to be at least a length substantially the same as the width of the medium 100. The width represents a length in a direction along the X-axis. The maximum application width of the pretreatment-agent ejecting portion 32 is set, for example, to be a length substantially the same as the width of the medium 100 supported by the medium support portion 31. The application width represents a length in a direction along the X-axis for which the pretreatment agent 101 can be ejected. The pretreatment-agent ejecting portion 32 can cause the pretreatment agent 101 to eject over the entire length of the width of the medium 100.

The absorbing-member support portion 33 is configured to support the absorbing member 102 disposed between the medium 100 and the pretreatment-agent ejecting portion 32. The medium 100 is in a state of being supported by the medium support portion 31. The absorbing member 102 has, for example, a rectangle outline shape. Short sides of the absorbing member 102 extend in a direction along the X-axis. Long sides of the absorbing member 102 extend in a direction along the Y-axis. The size of the absorbing member 102 is set approximately to be a size that allows the absorbing member 102 to cover the entire area of the upper surface of the medium 100 supported by the medium support portion 31.

The absorbing-member support portion 33 includes the two guide rollers 33A and 33B. Both of the guide rollers 33A and 33B are identical to each other, and extend in a direction along the X-axis. Both of the guide rollers 33A and 33B are separated from each other in a direction along the Y-axis. The separation distance between both of the guide rollers 33A and 33B is set, for example, to be a length substantially the same as or slightly longer than the length of the pretreatment-agent ejecting portion 32 in a direction along the Y-axis. That is, the two guide rollers 33A and 33B are provided with the pretreatment-agent ejecting portion 32 being disposed therebetween in a direction along the Y-axis, as viewed from a direction along the Z-axis. Both ends of the guide roller 33A are rotatably supported through a support portion (not illustrated) provided, for example, within the first housing 13. The guide roller 33B is provided in a manner similar to the guide roller 33A.

The pressing unit 34 presses the absorbing member 102 toward the medium 100. The medium 100 is in a state of being supported by the medium support portion 31. The pressing unit 34 is provided so as not to overlap with the pretreatment-agent ejecting portion 32 and the absorbing-member support portion 33, as viewed from the direction of the pretreatment agent 101 ejected. More specifically, the pressing unit 34 is disposed at a side of the pretreatment-agent ejecting portion 32 and the absorbing-member support portion 33 in a direction along the Y-axis that is a direction in which the pressing unit 34 moves relatively to the medium 100, as viewed from the direction of the pretreatment agent 101 ejected. The pressing unit 34 includes the press roller 34A. The press roller 34A extends in a direction along the X-axis. The press roller 34A is disposed at an opposite side from the guide roller 33B in a direction along the Y-axis with the guide roller 33A being a reference. That is, the guide roller 33A is disposed between the press roller 34A and the guide roller 33B in a direction along the Y-axis. Both ends of the press roller 34A is rotatably supported, for example, through a support portion (not illustrated) provided within the housing 12.

Next, operation of the pretreatment device 30 will be described.

However, a region of the medium 100 for application of the pretreatment agent 101 may be a partial portion of the upper surface of the medium 100 supported by the medium support portion 31 or may be the entire area of the upper surface of the medium 100 supported by the medium support portion 31.

Incidentally, at the time of applying pretreatment to the medium 100, the medium 100 supported by the medium support portion 31 is moved by the transport device 18 to the starting position for pretreatment. Upon the medium 100 reaching the starting position for pretreatment, the transport device 18 is stopped temporarily. In this state, the absorbing member 102 is set, for example, in a manner that the absorbing member 102 is fed by the feeding portion 35 described above to the upper surface of the medium 100. However, the feeding portion 35 is provided in a manner such that the absorbing member 102 having a rectangular outline shape can be fed.

After the absorbing member 102 is set at the upper surface of the medium 100, an operation for applying the pretreatment agent 101 to the entire area of the application region of the medium 100 is started. That is, the transport device 18 transports the medium 100 at a predetermined velocity in a frontward direction along the Y-axis. At this time, due to friction between the medium 100 and a portion of the absorbing member 102 that is in contact with the medium 100, the absorbing member 102 moves in a frontward direction along the Y-axis integrally with the medium 100 while being supported by the two guide rollers 33A and 33B. In association with this movement, the absorbing member 102 is guided, for example, by a guiding member (not illustrated) provided within the first housing 13, and is set to be in a state of being disposed between the press roller 34A and the medium 100, and also be in a state of being supported by the two guide rollers 33A and 33B. The pretreatment-agent ejecting portion 32 causes the pretreatment agent 101 to eject toward the application region set at the medium 100 that is moved by the transport device 18.

The pretreatment agent 101 is first sprayed onto the absorbing member 102 disposed between the pretreatment-agent ejecting portion 32 and the medium 100. A portion of the pretreatment agent 101 is absorbed by the absorbing member 102 while the rest of the pretreatment agent 101 that is not absorbed passes through the absorbing member 102 and adheres to the medium 100. When a mist of the pretreatment agent 101 occurs, this mist is absorbed by the absorbing member 102. A portion of the absorbing member 102 into which the pretreatment agent 101 has been infiltrated is sequentially pressed against the medium 100 by the press roller 34A in association with movement of the medium 100. This makes it possible to apply, to the medium 100, the pretreatment agent 101 squeezed from the absorbing member 102. Eventually, the absorbing member 102 is pressed against the entire area of the region of the medium 100 for application of the pretreatment agent 101, thereby applying the pretreatment agent 101 to the entire area of the region for application of the pretreatment agent 101.

Then, the pretreatment to the medium 100 is completed.

It should be noted that the used absorbing member 102 may be collected or may be reused in accordance with the region for application of the pretreatment agent 101, the region being set in the medium 100. The collection of the medium 100 supported by the medium support portion 31 is performed by the winding unit 36. However, the winding unit 36 is provided in a manner such that the absorbing member 102 having a rectangular outline shape can be wound.

Note that the pretreatment-agent ejecting portion 32, the two guide rollers 33A and 33B, and the press roller 34A may be provided so as to integrally move in a direction along the Y-axis through drive of a movement mechanism (not illustrated) provided in the housing 12. When this configuration is employed, it is only necessary to move a first movement unit and a second movement unit relatively to each other in a direction along the Y-axis, the first movement unit including the pretreatment-agent ejecting portion 32, the two guide rollers 33A and 33B, and the press roller 34A, the second movement unit including the medium 100 and the absorbing member 102. For example, either one of the following two operations (C1) and (C2) may be employed as an operation used to apply pretreatment to the medium 100.

(C1) In a state where the medium 100 and the absorbing member 102 are at rest, the pretreatment-agent ejecting portion 32, the two guide rollers 33A and 33B, and the press roller 34A are integrally moved in the frontward direction or the rearward direction along the Y-axis.

(C2) The medium 100 and the absorbing member 102 as well as the pretreatment-agent ejecting portion 32, the two guide rollers 33A and 33B, and the press roller 34A are moved such that the direction of movement of the medium 100 and the absorbing member 102 and the direction of movement of the pretreatment-agent ejecting portion 32, the two guide rollers 33A and 33B, and the press roller 34A are opposite to each other in a direction along the Y-axis.

Effect of Second Embodiment

Thus, with the second embodiment, it is possible to obtain the following effects, in addition to the effects of (1) to (5) of the first embodiment.

(7) The pretreatment-agent ejecting portion 32 has a line-shaped head. In addition, the maximum application width of the pretreatment-agent ejecting portion 32 is set, for example, to be a length substantially the same as the width of the medium 100 supported by the medium support portion 31. Thus, even when the region of the medium 100 for application of the pretreatment agent 101 is set to be the entire area of the upper surface of the medium 100 supported by the medium support portion 31, it is possible to apply the pretreatment agent 101 to the entire area of the region of the medium 100 for application of the pretreatment agent 101 only by performing, one time, an operation of pretreatment by the pretreatment device 30.

(8) In a case of employing a configuration in which the pretreatment-agent ejecting portion 32 is fixed within the housing 12, there is no need to provide a configuration used to move the pretreatment-agent ejecting portion 32, the two guide rollers 33A and 33B, and the press roller 34A. This enables the configuration of the pretreatment device 30 and the configuration of the printing apparatus 11 to be simplified. In addition, this also makes it possible to reduce the size of the pretreatment device 30 as well as the size of the printing apparatus 11.

(9) The pretreatment-agent ejecting portion 32 is provided in a line that extends along a direction intersecting the transport direction of the medium 100. In addition, the pretreatment-agent ejecting portion 32, the pressing unit 34, and the absorbing-member support portion 33 are provided so as to be able to move relatively to the medium 100 along the transport direction. The pretreatment agent 101 can be applied to the medium 100 in keeping with the configuration of this pretreatment device 30. That is, by moving the pretreatment-agent ejecting portion 32, the pressing unit 34, and the absorbing-member support portion 33 relatively to the medium 100 in a direction along the Y-axis, which is the transport direction of the medium 100, it is possible to apply the pretreatment agent 101 to the medium 100.

Third Embodiment

Next, a third embodiment in which a pretreatment device is embodied in the printing apparatus will be described. The present embodiment basically has a configuration similar to that of the first embodiment described above and illustrated in FIGS. 1 to 3. However, the present embodiment differs from the first embodiment in terms of a moving direction of the pretreatment-agent ejecting portion 32. Thus, the same reference characters are attached to members and configurations similar to those of the first embodiment, and detailed explanation thereof will not be made.

Figure 5:
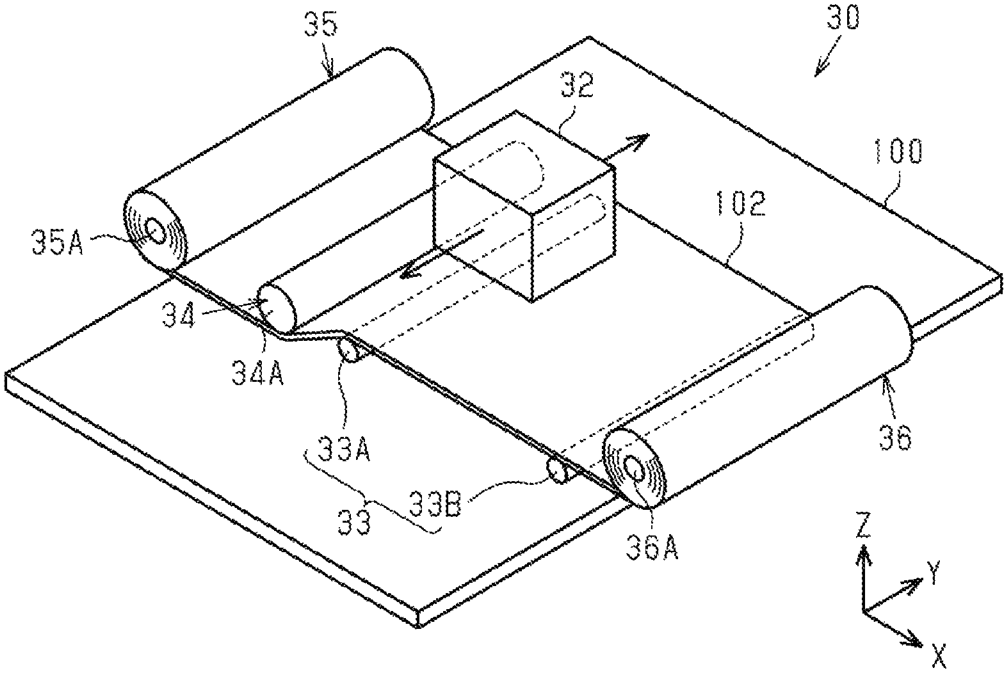
FIG. 5 is a perspective view illustrating a pretreatment device according to a third embodiment.

As illustrated in FIG. 5, the pretreatment-agent ejecting portion 32 is provided so as to be able to move in a direction along the Y-axis through drive of a first movement mechanism (not illustrated) provided in the housing 12. The size of the pretreatment-agent ejecting portion 32 is set to be an appropriate size in accordance with product specifications or the like. The two guide rollers 33A and 33B and the press roller 34A are provided so as to be able to integrally move in a direction along the X-axis through drive of a second movement mechanism (not illustrated) provided in the housing 12. The width of the absorbing member 102 is set in accordance with product specifications or the like, and is set, for example, to be a length wider than the width of the absorbing member 102 used in the first embodiment described above and illustrated in FIG. 2. The width represents a length in a direction along the Y-axis.

Incidentally, at the time of applying pretreatment to the medium 100, the absorbing member 102 fed from the feeding portion 35 is kept in a state of being supported by the absorbing-member support portion 33. In addition, at the time of applying pretreatment to the medium 100, the medium 100 supported by the medium support portion 31 is moved by the transport device 18 to the starting position for pretreatment. The starting position for pretreatment is a position from which the pretreatment-agent ejecting portion 32 can travel, in a direction along the Y-axis, above the region of the medium 100 for application of the pretreatment agent 101. Here, by way of example, the region of the medium 100 for application of the pretreatment agent 101 is a portion of the upper surface of the medium 100 supported by the medium support portion 31, and the entire application region overlaps with the absorbing member 102 as viewed from a direction along the Z-axis. Furthermore, the width of the region of the medium 100 for application of the pretreatment agent 101 is set approximately to be a length that fits in a eject region where the pretreatment agent 101 is ejected from the pretreatment-agent ejecting portion 32. The width represents a length in a direction along the X-axis. The press roller 34A is disposed at a side of the pretreatment-agent ejecting portion 32 and the guide roller 33A, and here, is disposed at the left side, as viewed from a direction along the Z-axis. That is, as viewed from a direction along the Z-axis, the press roller 34A is disposed at the left side along the X-axis relatively to the region of the medium 100 for application of the pretreatment agent 101.

After the medium 100 is moved to the starting position for pretreatment, the transport device 18 is kept in a stopped state. In this state, the pretreatment-agent ejecting portion 32 starts an operation for applying the pretreatment agent 101 to the entire area of the application region of the medium 100. The pretreatment-agent ejecting portion 32 causes the pretreatment agent 101 to eject toward the region of the medium 100 for application of the pretreatment agent 101 while moving in the frontward direction or the rearward direction along the Y-axis through drive of the first movement mechanism. After ejecting of the pretreatment agent 101 is completed, the two guide rollers 33A and 33B, and the press roller 34A are integrally moved toward the right direction along the X-axis through drive of the second movement mechanism. A portion of the absorbing member 102 into which the pretreatment agent 101 is infiltrated is pressed by the press roller 34A against the upper surface of the medium 100. This makes it possible to transfer, to the medium 100, the pretreatment agent 101 infiltrated into the absorbing member 102.

Then, the pretreatment to the medium 100 is completed.

It should be noted that, depending on product specifications or the like, the pretreatment-agent ejecting portion 32 may be provided so as to be able to move not only in a direction along the Y-axis but also in a direction along the X-axis, through drive of the first movement mechanism.

Effect of Third Embodiment

Thus, with the third embodiment, it is possible to obtain the following effects, in addition to the effects of (1) to (5) of the first embodiment.

(10) The pretreatment-agent ejecting portion 32 is provided so as to be able to move relatively to the medium 100 in a direction intersecting the direction of the pretreatment agent 101 ejected and also intersecting the moving direction of the pressing unit 34 and the absorbing-member support portion 33. In addition, the pressing unit 34 and the absorbing-member support portion 33 are provided so as to be able to move relatively to the medium 100 in a direction intersecting the direction of the pretreatment agent 101 ejected. The pretreatment agent 101 can be applied to the medium 100 in keeping with the configuration of this pretreatment device 30. That is, the pretreatment-agent ejecting portion 32 is moved relatively to the medium 100 in a direction along the Y-axis intersecting the direction of the pretreatment agent 101 ejected and also intersecting the moving direction of the pressing unit 34 and the absorbing-member support portion 33. Furthermore, the pressing unit 34 and the absorbing-member support portion 33 are moved relatively to the medium 100 in a direction along the X-axis intersecting the direction of the pretreatment agent 101 ejected. These operations enable the pretreatment agent 101 to be applied to the medium 100.

(11) In a case of employing a configuration in which the pretreatment-agent ejecting portion 32 serving as the pretreatment device 30 moves in both of the direction along the X-axis and the direction along the Y-axis, it is possible to apply the pretreatment agent 101 to application regions having various types of sizes and various outline shapes.

Fourth Embodiment

Next, a fourth embodiment in which a pretreatment device is embodied in the printing apparatus will be described. The present embodiment basically has a configuration similar to that of the first embodiment described above and illustrated in FIGS. 1 to 3. However, the present embodiment differs from the first embodiment in terms of the configuration of the pressing unit 34. Thus, the same reference characters are attached to members and configurations similar to those of the first embodiment, and detailed explanation thereof will not be made.

Figure 6:
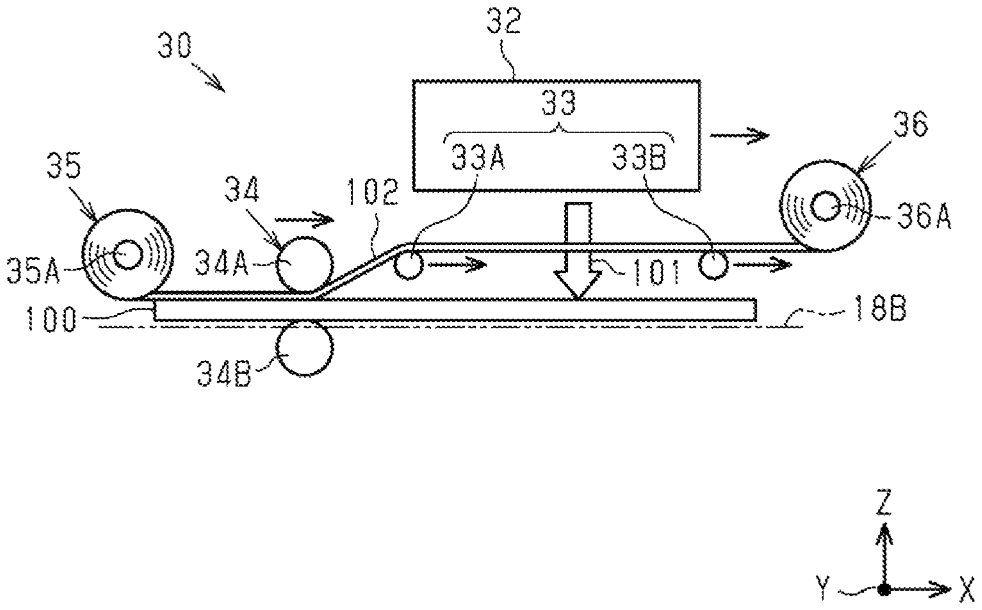
FIG. 6 is a diagram illustrating a configuration of a pretreatment device according to a fourth embodiment.

As illustrated in FIG. 6, the pressing unit 34 includes another press roller 34B, in addition to the press roller 34A. The press roller 34B extends in a direction along the Y-axis. The medium 100 and the absorbing member 102 are disposed between the two press rollers 34A and 34B in a direction along the Z-axis. The press roller 34B is rotatably supported, for example, through a supporting member (not illustrated) coupled to the pretreatment-agent ejecting portion 32. Thus, the pretreatment-agent ejecting portion 32, the two guide rollers 33A and 33B, and the two press rollers 34A and 34B integrally move in a direction along the X-axis through drive of the movement mechanism described above.

The medium 100 transported by the transport device 18 can be interposed between the two press rollers 34A and 34B. However, for example, a transport device of a belt transport type or of a roller transport type is used for the transport device 18.

The transport device of a belt transport type includes an endless-shaped belt 18B that travels in a circulating manner with rotation of two pulleys, and transports the medium 100 mounted on the upper surface of this belt 18B. The belt is, for example, made of rubber. The belt 18B and the medium 100 are interposed between the two press rollers 34A and 34B through drive of the transport device.

The transport device of a roller transport type includes a plurality of rollers rotatably supported, and transports the medium 100 mounted on these rollers. The rollers each extend in a direction along the X-axis. The medium 100 is interposed between the two press rollers 34A and 34B through drive of the transport device. The pretreatment device 30 is disposed between specific two rollers adjacent to each other in a direction along the Y-axis as viewed from a direction along the Z-axis. The distance between the specific two rollers is set approximately to a distance that does not cause interference with the press roller 34B that moves in a direction along the X-axis.

Incidentally, at the time of applying pretreatment to the medium 100, the two press rollers 34A and 34B follow the pretreatment-agent ejecting portion 32 and the two guide rollers 33A and 33B. The two press rollers 34A and 34B move in the right direction and along the X-axis in a state where at least the medium 100 and the absorbing member 102 onto which the pretreatment agent 101 has been sprayed are sandwiched between the two press rollers 34A and 34B. The absorbing member 102 is pressed against the upper surface of the medium 100 at the timing when the absorbing member 102 is sandwiched between the two press rollers 34A and 34B. This makes it possible to transfer, to the medium 100, the pretreatment agent 101 infiltrated into the absorbing member 102.

Effect of Fourth Embodiment

Thus, with the fourth embodiment, it is possible to obtain the following effect, in addition to the effects of (1) to (6) in the first embodiment.

(12) The absorbing member 102 onto which the pretreatment agent 101 has been sprayed, together with at least the medium 100, is sandwiched by the two press rollers 34A and 34B. This makes it possible to favorably transfer the pretreatment agent 101 infiltrated into the absorbing member 102, to the medium 100.

Fifth Embodiment

Next, a fifth embodiment in which a pretreatment device is embodied in a printing apparatus will be described. The present embodiment basically has a configuration similar to that of the first embodiment described above and illustrated in FIGS. 1 to 3. Thus, the same reference characters are attached to members and configurations similar to those of the first embodiment, and detailed explanation thereof will not be made.

Figure 7:
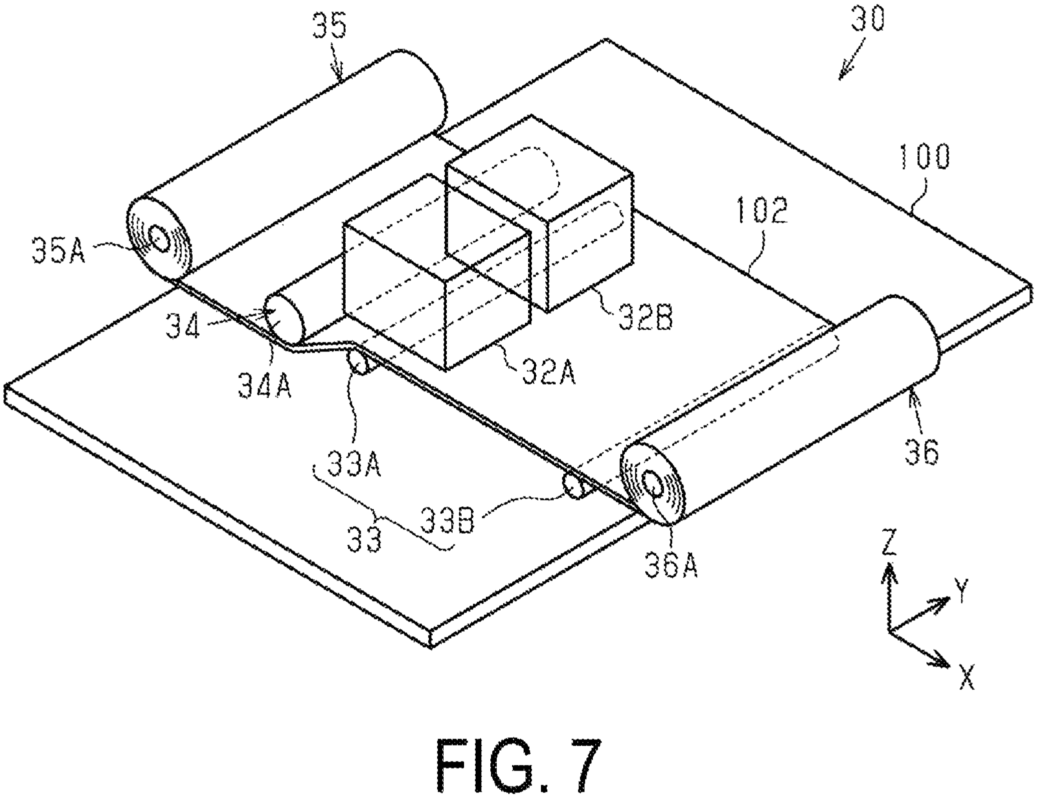
FIG. 7 is a perspective view illustrating a pretreatment device according to a fifth embodiment.

As illustrated in FIG. 7, the pretreatment device 30 includes two pretreatment-agent ejecting portions 32A and 32B. The two pretreatment-agent ejecting portions 32A and 32B, the two guide rollers 33A and 33B, and the press roller 34A are provided so as to be able to integrally move in a direction along the X-axis through drive of the movement mechanism described above. The two pretreatment-agent ejecting portions 32A and 32B are provided, for example, alongside each other in a direction along the Y-axis. Positions where the feeding portion 35 and the winding unit 36 are disposed are adjusted so as not to interfere with movement of the two pretreatment-agent ejecting portions 32A and 32B, the two guide rollers 33A and 33B, and the press roller 34A.

It should be noted that the number of pretreatment-agent ejecting portions and the direction where these pretreatment-agent ejecting portions are arranged may be changed on an as-necessary basis depending on product specifications or the like. For example, the number of the pretreatment-agent ejecting portions may be three or more. In addition, a plurality of pretreatment ejecting portions may be provided at positions shifted in a direction along the X-axis. Furthermore, one pretreatment-agent ejecting portion may include one head, or may include a plurality of heads.

Effect of Fifth Embodiment

Thus, with the fifth embodiment, it is possible to obtain the following effect, in addition to the effects of (1) to (6) of the first embodiment.

(13) With the plurality of pretreatment-agent ejecting portions 32A and 32B being provided, it is possible to apply the pretreatment agent 101 to the medium 100 in a wider area and in a quicker manner. Thus, it is possible to shorten the time required to apply pretreatment to the medium 100.

Sixth Embodiment

Next, a sixth embodiment in which a pretreatment device is embodied in the printing apparatus will be described. The present embodiment basically has a configuration similar to that of the first embodiment described above and illustrated in FIGS. 1 to 3. Thus, the same reference characters are attached to members and configurations similar to those of the first embodiment, and detailed explanation thereof will not be made.

Figure 8:
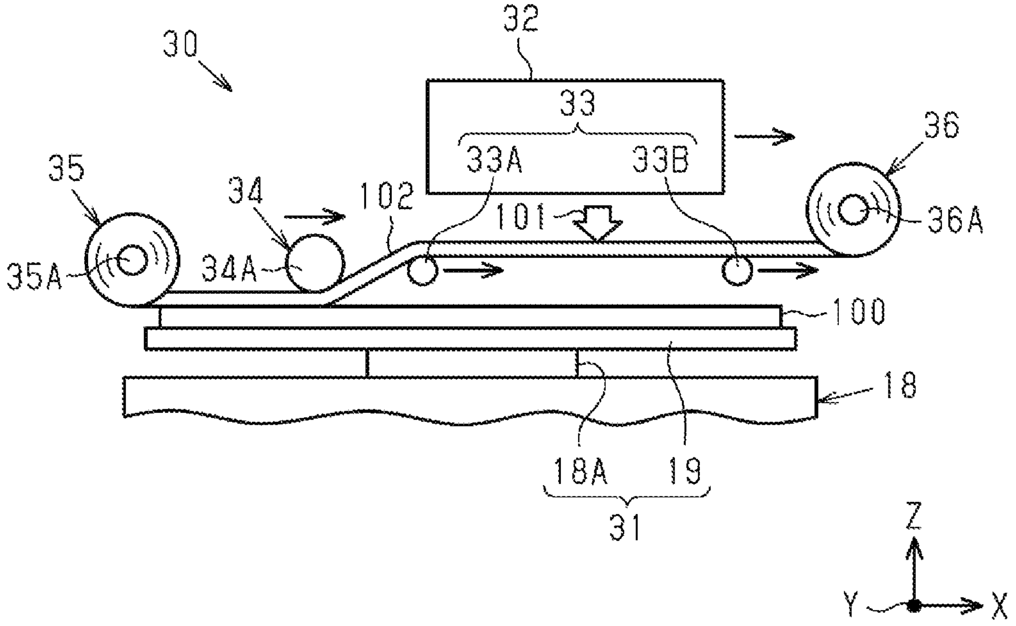
FIG. 8 is a diagram illustrating a configuration of a pretreatment device according to a sixth embodiment.

As illustrated in FIG. 8, the absorbing member 102 is provided on the basis of a viewpoint in which the pretreatment agent 101 ejected from the pretreatment-agent ejecting portion 32 is not caused to penetrate through. For example, the thickness of the absorbing member 102 is set to be thicker than the thickness of the absorbing member 102 in the first embodiment described above and illustrated in FIG. 1. The thickness represents a length of the absorbing member 102 in a direction along the Z-axis. As the thickness of the absorbing member 102 increases, the volume per unit area of front surface of the absorbing member 102 increases. For example, the thickness of the absorbing member 102 is set approximately to be a thickness that allows the absorbing member 102 to absorb all the pretreatment agent 101 ejected from the pretreatment-agent ejecting portion 32 and hold the absorbed pretreatment agent 101 within the absorbing member 102.

Incidentally, at the time of applying pretreatment to the medium 100, the pretreatment-agent ejecting portion 32 causes the pretreatment agent 101 to eject while moving in the right direction along the X-axis. The pretreatment agent 101 is first sprayed onto the absorbing member 102 located between the pretreatment-agent ejecting portion 32 and the medium 100. All of this pretreatment agent 101 that has been sprayed is basically absorbed by the absorbing member 102. This makes it possible to prevent a portion of the pretreatment agent 101 ejected from the pretreatment-agent ejecting portion 32 from passing through the absorbing member 102 to adhere to the medium 100. In addition, it is possible to prevent the pretreatment agent 101 that the absorbing member 102 fails to absorb from dripping to adhere to the medium 100.

The press roller 34A follows the pretreatment-agent ejecting portion 32 and the two guide rollers 33A and 33B. The press roller 34A moves in the right direction along the X-axis while pressing, against the upper surface of the medium 100, the absorbing member 102 onto which the pretreatment agent 101 has been sprayed. With the absorbing member 102 being pressed against the medium 100, it is possible to transfer, to the medium 100, the pretreatment agent 101 infiltrated into the absorbing member 102.

Effect of Sixth Embodiment

Thus, with the sixth embodiment, it is possible to obtain the following effect, in addition to the effects of (1) to (6) of the first embodiment.

(14) It is possible to prevent the pretreatment agent 101 from adhering to the medium 100 before the absorbing member 102 is pressed by the press roller 34A against the medium 100. Only by pressing the absorbing member 102 by the press roller 34A, it is possible to transfer, to the medium 100, the pretreatment agent 101 stored within the absorbing member 102.

Other Embodiments

Note that the first to sixth embodiments may be modified and executed in the following manner. In addition, each of the embodiments and the following modification examples may be combined and executed, provided that they are not technically contradict.

When the medium 100 is fabric that does not have any uneven potion, the pretreatment agent 101 may be ejected in a state where the absorbing member 102 overlaps with the medium 100. However, from the viewpoint of suppressing occurrence of a mist of the pretreatment agent 101, it is preferable that the distance between the absorbing member 102 and the pretreatment-agent ejecting portion 32 is set to be a shorter distance within an allowable range. For the pretreatment device 30, it is possible to employ a configuration in which the absorbing-member support portion 33 is not provided.

The absorbing-member support portion 33 may have any configuration, provided that the pretreatment agent 101 that overflows and falls down from the absorbing member 102 is not prevented from reaching the medium 100. In place of, for example, the two guide rollers 33A and 33B, the absorbing-member support portion 33 may include two plate-shaped guide members or network-shaped guide members. The plate-shaped guide members are provided so as to extend in a direction along the Y-axis. In addition, for example, the network-shaped guide members each have a rectangle shape as viewed from a direction along the Z-axis, and are provided so as to be opposed to the absorbing member 102 in a direction along the Z-axis.

The printing apparatus 11 may include, for example, a heating device, a post-treatment device, or other devices, in addition to the transport device 18, the liquid ejecting device 20, and the pretreatment device 30. For example, the heating device is configured to dry the medium 100 to which the pretreatment agent 101 has been applied, to fix the pretreatment agent 101 at the medium 100. For example, after printing of an image to the medium 100 is completed, the post-treatment device, for example, applies a post-treatment agent to the printing region or heats the printing region to fix the printing liquid at the medium 100.

The pretreatment device 30 may have an automatic cleaning function configured to automatically clean the press roller 34A. A procedure of cleaning the press roller 34A is performed in the following manner, as one example. That is, a cleaning liquid is first ejected onto the absorbing member 102 from the pretreatment-agent ejecting portion 32, in place of the pretreatment agent 101. However, the pretreatment-agent ejecting portion 32 is kept in a state of being stopped. Next, the absorbing member 102 is wound in a state where the press roller 34A is pressed against the absorbing member 102, to cause the press roller 34A to rotate. The absorbing member 102 is wound, for example, by causing the feeding shaft 35A of the feeding portion 35 to rotate in an opposite direction from the feeding direction. With this configuration, the pretreatment agent 101 adhering to the front surface of the press roller 34A is wiped up by the absorbing member 102 into which the cleaning liquid is infiltrated, thereby being removed. It should be noted that it may be possible to provide a driving unit configured to cause the press roller 34A to rotate, and use the driving roller to cause the press roller 34A to rotate in an inverted direction to a direction in which the absorbing member 102 is wound. With this configuration, it is possible to more effectively remove the pretreatment agent 101 adhering to the front surface of the press roller 34A.

The pretreatment device 30 may be provided at a position more toward the frontward direction along the Y-axis than the liquid ejecting device 20. If the pretreatment device 30 and the liquid ejecting device 20 are provided alongside each other in a direction along the Y-axis that is the transport direction of the medium 100, it is possible to apply pretreatment to the medium 100 and perform printing of an image in a continuous manner.

It may be possible to provide the pretreatment device 30 as an independent device that is separate from the printing apparatus 11.

Technical Ideas

Below, technical ideas as well as operation and effects thereof that are understood from the above-described embodiments and modification examples will be described.

(A) A pretreatment device includes: a medium support portion configured to support a medium that is transported; a pretreatment-agent ejecting portion configured to eject a pretreatment agent; an absorbing-member support portion configured to support an absorbing member between the medium and the pretreatment-agent ejecting portion in a direction of the pretreatment agent ejected, the absorbing member being configured to absorb the pretreatment agent ejected from the pretreatment-agent ejecting portion; and a pressing unit configured to press, toward the medium, the absorbing member to which the pretreatment agent is ejected from the pretreatment-agent ejecting portion.

With this configuration, the absorbing member is supported by the absorbing-member support portion between the pretreatment-agent ejecting portion and the medium. This makes the pretreatment agent, which is ejected from the pretreatment-agent ejecting portion, first sprayed onto the absorbing member. While a mist of the pretreatment agent may happen at this time, this mist is absorbed by the pretreatment agent. Thus, it is possible to suppress spreading of the mist of the pretreatment agent. In addition, while the pretreatment agent sprayed onto the absorbing member infiltrates into the absorbing member, the absorbing member into which the pretreatment agent infiltrates is pressed against the medium by the pressing unit, which allows the pretreatment agent infiltrating into the absorbing member to be applied to the medium. In this manner, by applying the pretreatment agent to the medium through the absorbing member, it is possible to diffuse the pretreatment agent on the absorbing member. Thus, it is possible to achieve uniform distribution of the pretreatment agent on the medium.

(B) The pretreatment device described above may include: a feeding portion configured to feed the absorbing member to the absorbing-member support portion; and a winding unit configured to wind the absorbing member supported by the absorbing-member support portion. This configuration eliminates the need of setting the absorbing member to the pretreatment device every time pretreatment is applied to a medium.

(C) The pretreatment device described above may be configured such that the absorbing-member support portion is provided between the absorbing member and the medium in a direction of the pretreatment agent ejected, and is configured to support the absorbing member at a position where the absorbing member is opposed to the pretreatment-agent ejecting portion in the direction of the pretreatment agent ejected.

This configuration makes it possible to accurately set a gap between the pretreatment-agent ejecting portion and the absorbing member.

(D) The pretreatment device described above may be configured such that the pretreatment-agent ejecting portion, the pressing unit, and the absorbing-member support portion are configured to move relatively to the medium in a direction intersecting the direction of the pretreatment agent ejected.

This configuration enables the pretreatment agent to be applied to the medium in keeping with the configuration of the pretreatment agent. That is, by moving the pretreatment-agent ejecting portion, the pressing unit, and the absorbing-member support portion relatively to the medium in a direction intersecting the direction of the pretreatment agent to eject, it is possible to apply the pretreatment agent to the medium.

(E) The pretreatment device described above may be configured such that the pressing unit and the absorbing-member support portion are configured to move relatively to the medium in a direction intersecting the direction of the pretreatment agent ejected. In addition, the pretreatment-agent ejecting portion may be configured to move relatively to the medium in a direction intersecting the direction of the pretreatment agent ejected and also intersecting a moving direction of the pressing unit and the absorbing-member support portion.

This configuration enables the pretreatment agent to be applied to the medium in keeping with the configuration of the pretreatment agent. That is, it is possible to apply the pretreatment agent to the medium by moving the pretreatment-agent ejecting portion relatively to the medium in a direction intersecting the direction of the pretreatment agent ejected and also intersecting the moving direction of the pressing unit and the absorbing-member support portion, and also moving the pressing unit and the absorbing-member support portion relatively to the medium in a direction intersecting the direction of the pretreatment agent ejected.

(F) The pretreatment-agent ejecting portion may be provided in a line extending along a direction intersecting a transport direction of the medium. In addition, the pretreatment-agent ejecting portion, the pressing unit, and the absorbing-member support portion may be configured to move relatively to the medium along the transport direction.

This configuration enables the pretreatment agent to be applied to the medium in keeping with the configuration of the pretreatment agent. That is, it is possible to apply the pretreatment agent to the medium by moving the pretreatment-agent ejecting portion, the pressing unit, and the absorbing-member support portion relatively to the medium in the transport direction of the medium.

(G) In the pretreatment device described above, the absorbing-member support portion may include two rollers provided so as to sandwich the pretreatment-agent ejecting portion in a moving direction of the pressing unit and the absorbing-member support portion as viewed from the direction of the pretreatment agent ejected.

With this configuration, it is possible to smoothly move the absorbing-member support portion while maintaining a gap between the pretreatment-agent ejecting portion and the absorbing member.

(H) In the pretreatment device described above, the pressing unit may be disposed at a side of the pretreatment-agent ejecting portion and the absorbing-member support portion in a direction in which the pressing unit moves relatively to the medium, as viewed from the direction of the pretreatment agent ejected.

With this configuration, it is possible to apply the pretreatment agent to the absorbing member, and subsequently transfer the pretreatment agent to the medium.

(I) A method of pretreatment for a pretreatment device including: a medium support portion configured to support a medium that is transported; a pretreatment-agent ejecting portion configured to eject a pretreatment agent; an absorbing-member support portion configured to support an absorbing member between the medium and the pretreatment-agent ejecting portion in a direction of the pretreatment agent ejected, the absorbing member being configured to absorb the pretreatment agent ejected from the pretreatment-agent ejecting portion; and a pressing unit configured to press, toward the medium, the absorbing member to which the pretreatment agent is ejected from the pretreatment-agent ejecting portion. This method of pretreatment for a pretreatment device includes: ejecting the pretreatment agent from the pretreatment-agent ejecting portion onto the absorbing member; and pressing, by the pressing unit, toward the medium the absorbing member to which the pretreatment agent is ejected to transfer, to the medium, the pretreatment agent absorbed by the absorbing member.

According to this method of pretreatment, it is possible to obtain an effect similar to that of the pretreatment device described above.

(J) A printing apparatus includes a pretreatment device and a liquid ejecting device, the pretreatment device including: a medium support portion configured to support a medium that is transported; a pretreatment-agent ejecting portion configured to eject a pretreatment agent; an absorbing-member support portion configured to support an absorbing member between the medium and the pretreatment-agent ejecting portion in a direction of the pretreatment agent ejected, the absorbing member being configured to absorb the pretreatment agent ejected from the pretreatment-agent ejecting portion; and a pressing unit configured to press, toward the medium, the absorbing member to which the pretreatment agent is ejected from the pretreatment-agent ejecting portion, the liquid ejecting device provided alongside the pretreatment device in a transport direction of the medium and including a liquid ejecting head configured to eject a liquid to the medium on which pretreatment is applied by the pretreatment device, to form an image.

According to this printing apparatus, it is possible to obtain an effect similar to that of the pretreatment device described above.

What is claimed is:

1. A pretreatment device comprising:

a medium support portion configured to support a medium that is transported;

a pretreatment-agent ejecting portion configured to eject a pretreatment agent;

an absorbing-member support portion configured to support an absorbing member between the medium and the pretreatment-agent ejecting portion in a direction in which the pretreatment agent is ejected, the absorbing member being configured to absorb the pretreatment agent ejected from the pretreatment-agent ejecting portion; and a pressing unit configured to press, toward the medium, the absorbing member to which the pretreatment agent is ejected from the pretreatment-agent ejecting portion.

2. The pretreatment device according to claim 1 comprising:

a feeding portion configured to feed the absorbing member to the absorbing-member support portion; and a winding unit configured to wind the absorbing member supported by the absorbing-member support portion.

3. The pretreatment device according to claim 1, wherein the absorbing-member support portion is provided between the absorbing member and the medium in a direction in which the pretreatment agent is ejected, and is configured to support the absorbing member at a position where the absorbing member is opposed to the pretreatment-agent ejecting portion in the direction in which the pretreatment agent is ejected.

4. The pretreatment device according to claim 1, wherein the pretreatment-agent ejecting portion, the pressing unit, and the absorbing-member support portion are configured to move relatively to the medium in a direction intersecting the direction in which the pretreatment agent is ejected.

5. The pretreatment device according to claim 4, wherein the absorbing-member support portion includes two rollers provided so as to sandwich the pretreatment-agent ejecting portion in a moving direction of the pressing unit and the absorbing-member support portion as viewed from the direction in which the pretreatment agent is ejected.

6. The pretreatment device according to claim 4, wherein the pressing unit is disposed at a side of the pretreatment-agent ejecting portion and the absorbing-member support portion in a direction in which the pressing unit moves relatively to the medium, as viewed from the direction in which the pretreatment agent is ejected.

7. The pretreatment device according to claim 1, wherein the pressing unit and the absorbing-member support portion are configured to move relatively to the medium in a direction intersecting the direction in which the pretreatment agent is ejected, and the pretreatment-agent ejecting portion is configured to move relatively to the medium in a direction intersecting the direction in which the pretreatment agent is ejected and also intersecting a moving direction of the pressing unit and the absorbing-member support portion.

8. The pretreatment device according to claim 1, wherein the pretreatment-agent ejecting portion is provided in a line extending along a direction intersecting a transport direction of the medium, and the pretreatment-agent ejecting portion, the pressing unit, and the absorbing-member support portion are configured to move relatively to the medium along the transport direction.

9. A method of pretreatment for a pretreatment device comprising:

a medium support portion configured to support a medium that is transported;

a pretreatment-agent ejecting portion configured to eject a pretreatment agent;

an absorbing-member support portion configured to support an absorbing member between the medium and the pretreatment-agent ejecting portion in a direction in which the pretreatment agent is ejected, the absorbing member being configured to absorb the pretreatment agent ejected from the pretreatment-agent ejecting portion; and a pressing unit configured to press, toward the medium, the absorbing member to which the pretreatment agent is ejected from the pretreatment-agent ejecting portion, the method comprising:

ejecting the pretreatment agent from the pretreatment-agent ejecting portion onto the absorbing member; and pressing, by the pressing unit, toward the medium the absorbing member to which the pretreatment agent is ejected to transfer, to the medium, the pretreatment agent absorbed by the absorbing member.

10. A printing apparatus comprising:

a pretreatment device; and a liquid ejecting device, the pretreatment device including:

a medium support portion configured to support a medium that is transported;

a pretreatment-agent ejecting portion configured to eject a pretreatment agent;

an absorbing-member support portion configured to support an absorbing member between the medium and the pretreatment-agent ejecting portion in a direction in which the pretreatment agent is ejected, the absorbing member being configured to absorb the pretreatment agent ejected from the pretreatment-agent ejecting portion; and a pressing unit configured to press, toward the medium, the absorbing member to which the pretreatment agent is ejected from the pretreatment-agent ejecting portion, the liquid ejecting device being provided alongside the pretreatment device in a transport direction of the medium and including a liquid ejecting head configured to eject a liquid to the medium on which pretreatment is applied by the pretreatment device, to form an image.

* * * * *